United States Patent [19]

Hamprecht

[11] 4,348,319

[45] Sep. 7, 1982

[54] PROCESS FOR THE PREPARATION OF CYANO-AZO DYESTUFFS

[75] Inventor: Rainer Hamprecht, Cologne, Fed. Rep. of Germany

[73] Assignee: Bayer Aktiengesellschaft, Leverkusen, Fed. Rep. of Germany

[21] Appl. No.: 223,064

[22] Filed: Jan. 7, 1981

Related U.S. Application Data

[63] Continuation of Ser. No. 776,411, Mar. 10, 1977, abandoned.

[30] Foreign Application Priority Data

Mar. 13, 1976 [DE] Fed. Rep. of Germany ....... 2610675

[51] Int. Cl.$^3$ ................ C07C 107/04; C07C 107/06; C09B 43/00
[52] U.S. Cl. ..................................... 260/208; 260/155; 260/156; 260/157; 260/158; 260/165; 260/205; 260/206; 260/207; 260/207.1; 260/207.5
[58] Field of Search .............. 260/208, 157, 156, 158, 260/155, 165, 205, 206, 207, 207.1, 207.5

[56] References Cited

U.S. PATENT DOCUMENTS 3,876,621  4/1975  Hagen et al. .................. 260/208 X
3,978,040  8/1976  Gottschlich et al. ........... 260/208 X

FOREIGN PATENT DOCUMENTS 1412922  11/1975  United Kingdom ................ 260/208

OTHER PUBLICATIONS

*Ullmanns Encyklopadie der technischen Chemie,* Edition II, vol. 16, Urban & Schwarzenberg: Munchen-Berlin, 1965, pp. 724–742.
*Ullmanns Encyklopadie der technischen Chemie,* Edition II, vol. 9, Urban & Schwarzenberg: Munchen, 1957, pp. 297–304.
Starks, "Journal of the American Chemical Society", vol. 93, 1971, pp. 195–199.
Ullman, vol. 16, pp. 724–726.

*Primary Examiner*—Charles F. Warren
*Attorney, Agent, or Firm*—Sprung, Horn, Kramer & Woods

[57] ABSTRACT

The invention relates to a process for the preparation of azo dyestuffs containing a cyano group in the ortho-position relative to the azo bridge, by reacting corresponding orthohalogeno-azo dyestuffs with metal cyanides in an aqueous medium in the presence of phase transfer catalysts, such as those from the series of quaternary ammonium and phosphonium salts and also tertiary sulphonium salts.

Compared with known processes for the preparation of o-cyano-azo dyestuffs the new method has the advantage of simpler, cheaper handling, improved yields and lesser pollution problems.

11 Claims, No Drawings

PROCESS FOR THE PREPARATION OF CYANO-AZO DYESTUFFS

This is a continuation of application Ser. No. 776,411, filed Mar. 10, 1977, now abandoned.

The subject of the invention is a process for the preparation of azo compounds which, in the diazo component, contain at least one cyano group in the ortho-position relative to the azo bridge, by reacting corresponding orthohalogeno-azo dyestuffs with metal cyanides in an aqueous or aqueous-organic medium.

The process is characterised in that the reaction is carried out in the presence of phase transfer catalysts, especially those from the series of quaternary ammonium and phosphonium salts and also tertiary sulphonium salts.

In this context, in accordance with E.V. Demlow [compare Angewandte Chemie 86, 187 (1974)], phase transfer catalysts are understood as those compounds which catalyse reactions between substances, which are partly in an organic phase and partly in an aqueous phase.

Suitable phase transfer catalysts for carrying out the process according to the invention are compounds of the formula I $$[XR^1R^2R^3(R^4)_n]^{\oplus}A^{\ominus} \qquad (I)$$

wherein
X represents nitrogen, phosphorus or sulphur,
$R^1$, $R^2$ and $R^3$ independently of one another represent alkyl, cycloalkyl, aralkyl or aryl,
$R^4$ represents alkyl or aralkyl,
n represents 0 or 1 and
A represents an anion,
with the proviso that n represents 1 when X denotes nitrogen or phosphorus and n represents 0 when X denotes sulphur.

Suitable alkyl radicals are straight-chain and branched $C_1$–$C_{20}$-alkyl radicals which can be substituted by halogen or by hydroxyl, alkoxy, cyano, alkoxycarbonyl, alkylcarbonyl or nitro groups.

Suitable cycloalkyl radicals are, for example, cyclopentyl and cyclohexyl.

Suitable aralkyl radicals are phenyl-$C_1$–$C_3$-alkyl radicals which can be substituted by halogen or by alkyl, hydroxyl, alkoxy, cyano, alkoxycarbonyl, alkylcarbonyl or nitro groups.

The radicals $R^1$, $R^2$, $R^3$ and $R^4$ can also be linked to one another in such a way that X is part of a heterocyclic structure.

Suitable anions are customary acid radicals. Examples which may be mentioned are: chloride, bromide, iodide, fluoride, sulphate, alkylsulphate, hydrogen sulphate, nitrate, phosphate, acetate, tosylate, benzenesulphonate and cyanide. Amongst these, chloride, bromide, alkylsulphate and cyanide are preferred.

Suitable phase transfer catalysts are tetraethyl-ammonium chloride, tetraethyl-ammonium cyanide, tetrapropyl-ammonium chloride, tetrabutyl-ammonium chloride, trimethyl-phenyl-ammonium chloride, trimethyl-phenyl-ammonium methylsulphate, trimethyl-(3-nitrophenyl)-ammonium chloride, tetraethyl-phosphonium chloride, tetrabutyl-phosphonium chloride, diethyl-phenyl-benzyl-ammonium chloride, propyl-diphenyl-benzyl-ammonium chloride, dimethyl-phenyl-benzyl-ammonium bromide, benzyl-nonyl-dibutyl-ammonium chloride, benzyl-decycl-dibutyl-ammonium chloride, benzyl-undecyl-dipropyl-ammonium chloride, benzyl-dodecyl-dimethyl-ammonium chloride ("Zephirol"), trimethyl-eicosyl-ammonium bromide, triphenyl-ethyl-phosphonium bromide, triphenyl-benzyl-phosphonium bromide, triphenyl-propyl-phosphonium chloride and tri-(p-hydroxyphenyl)-sulphonium chloride.

High-molecular anion exchangers with quaternary ammonium or phosphonium radicals can also be used. Ammonium and phosphonium salts, especially those in which the radicals R contain at least 6 C atoms, are preferred.

The phase transfer catalysts are employed in amounts of 0.1 to 100 mol percent, and preferably 1 to 20 mol percent, relative to the halogen to be replaced.

Suitable metal cyanides for carrying out the process according to the invention are the cyanides of the first and second principal group of the periodic table and also those of the first and second sub-group of the periodic table, such as, for example, NaCN, KCN, $Ca(CN)_2$, $Zn(CN)_2$ and AgCN, but especially copper-I cyanide and its cyano complexes of the formula II $$Me_pCu(CN)_{p+1} \qquad (II)$$

in which
Me denotes an alkali metal, such as, for example, Li, Na or K and
p can assume the values 1, 2 and 3,
and also cyano complexes of zinc, which have the formula III $$Me_qZn(CN)_{q+2} \qquad (III)$$

in which
Me has the above mentioned meaning and q can assume the values 1 and 2.

The new process can be carried out using different variants.

A preferred embodiment consists in reacting o-halogeno-azo dyestuffs with copper-I cyanide in a purely aqueous medium in the presence of phase transfer catalysts of the formula I, preferably those in which the radicals R contain at least 6 C atoms.

A further embodiment consists in reacting o-halogeno-azo dyestuffs with zinc cyanide complexes of the formula III in a water/organic solvent two-phase system, in the presence of phase transfer catalysts of the formula I.

A further embodiment which is particularly preferred consists in reacting o-halogeno-azo dyestuffs with copper cyanide complexes of the formula II in a water/organic solvent two-phase system, in the presence of phase transfer catalysts of the formula I. In this case, new complexes of the formula IV $$[XR^1R^2R^3(R^4)_n]_pCu(CN)_{p+1} \qquad (IV)$$

in which
the radicals $R^1$-$R^4$, X, n and p have the meaning mentioned above in formula I and II,
are formed. It is also possible first to isolate these complexes of the formula IV and then to react them with o-halogeno-azo dyestuffs.

The new process is particularly suitable for the preparation of azo dyestuffs of the formula

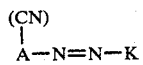 (V)

from corresponding halogeno-azo dyestuffs of the formula

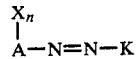 (VI)

wherein
A denotes an aromatic-carbocyclic radical, preferably of the benzene or naphthalene series, or denotes a benzisothiazole radical,
X denotes a halogen substituent, preferably chlorine or bromine, which is present in the radical A in the o-position relative to the azo group,
K denotes the radical of a coupling component and
n denotes 1 or 2.
Preferably, dyestuffs of the formula VII

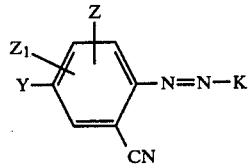 (VII)

and VIII

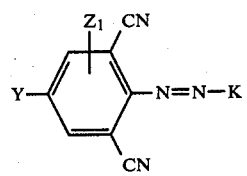 (VIII)

can be prepared by this new process. In these formulae Y denotes hydrogen or a $-NO_2$, $-CN$, $-R_1$, $-OR_1$, $-CF_3$, $-SO_2R_1$, $$-SO_2N\begin{matrix}R_2\\R_3\end{matrix},$$

$-F$, $-Cl$, $-Br$, $-COR_4$ or $-N=N-R_5$ group
in which
$R_1$ represents an optionally substituted alkyl, aralkyl or aryl radical,
$R_2$ and $R_3$ represent hydrogen or identical or different substituents which can also conjointly be a constituent of a heterocyclic ring,
$R_4$ represents hydrogen, $-OH$ or the radical $-R_1$, $-OR_1$ or

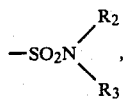 and $R_5$ represents aryl, and

Z denotes hydrogen or substituents and, amongst the latter, preferably denotes the groups $-NO_2$, $-CN$, $-R_1$, $-OR_1$, $-CF_3$, $-SO_2R_1$, $$-SO_2N\begin{matrix}R_2\\R_3\end{matrix},$$

$-Cl$, $-Br$, and $-COR_4$ and heterocyclic radicals of the formula IX, X and XI $$\text{(IX)} \qquad \text{(X)} \qquad \text{(XI)}$$

in which
$R_6$ represents hydrogen or $R_1$,
$R_7$ represents methyl or, conjointly with $R_8$, also represents a fused benzene ring and
$R_8$ represents $-CO_2CH_3$ or $-CO_2C_2H_5$, and
$Z_1$ denotes hydrogen or substituents and amongst the latter preferably denotes the groups $-NO_2$, $-CN$, $-R_1$, $-OR_1$, $-CF_3$, $-SO_2R_1$, $SO_2R_4$, $$-SO_2N\begin{matrix}R_2\\R_3\end{matrix},$$

$-Cl$, $-Br$ and $-COR_4$
and wherein
Z and $Z_1$ can also conjointly form a fused isothiazole ring; and
K has the meaning already indicated.
Suitable radicals K are radicals of coupling components of the benzene, naphthalene, indole, pyridine and tetrahydroquinoline series but preferably N-substituted p-aminoarylene radicals and in particular anilines of the formula IX (IX)

In this formula:
$R_9$ denotes hydrogen, alkyl, alkoxy, aryloxy, alkylcarbonylamino, aralkylcarbonylamino, cycloalkylcarbonylamino, arylcarbonylamino, heterylcarbonylamino, alkoxycarbonylamino, alkylsulphonylamino, arylsulphonylamino, aminocarbonylamino, CN, $CF_3$, carbamoyl, dialkylaminocarbonyl, alkoxycarbonyl, sulphamoyl, dialkylaminosulphonyl or alkylsulphonyl,
$R_{10}$ denotes hydrogen, alkyl, aralkyl or aryl,
$R_{11}$ denotes hydrogen, alkyl or aralkyl and
$R_{12}$ denotes hydrogen, alkyl, alkoxy, aryloxy, aralkoxy, halogen, CN, carboxyl or alkoxycarbonyl.
The alkyl and alkoxy radicals mentioned above in any context (that is to say, for example, also alkylsulphonyl or alkoxycarbonyl) are to be understood as, preferably, those radicals which contain 1-4 C atoms and are preferably monosubstituted by OH, CN, halogen, $C_1$-$C_4$-alkoxy or $C_2$-$C_5$-alkylcarbonyloxy or by ammonium groups of the formula

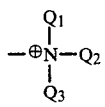

in which $Q_1$, $Q_2$ and $Q_3$ denote alkyl, cycloalkyl, aralkyl or aryl or form the remaining members of a N-heterocyclic structure, such as pyridine, imidazole and triazole, whilst the aryl and aryloxy radicals are to be understood as, preferably, phenyl or phenoxy radicals which are optionally monosubstituted by Cl, Br, $NO_2$, CN, ($C_1$-$C_4$)-alkoxy or ($C_1$-$C_4$)-alkyl.

Dyestuffs of the formula XIII

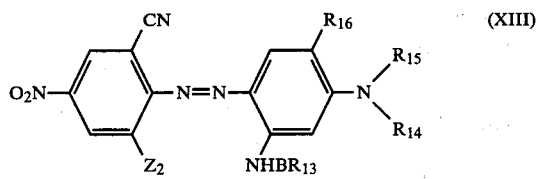

wherein $Z_2$ denotes nitro, cyano, trifluoromethyl, halogen, methylsulphonyl, ethylsulphonyl or propylsulphonyl, carbamoyl, N-methylcarbamoyl, N-ethylcarbamoyl, N,N-dimethylcarbamoyl, N,N-diethylcarbamoyl, sulphamoyl, N-methylsulphamoyl, N-ethylsulphamoyl, N,N-dimethylsulphamoyl or N,N-diethylsulphamoyl, B denotes —CO—, —$CO_2$— or —$SO_2$—, $R_{13}$ denotes alkyl, aralkyl, aryl or $NV_1V_2$, $V_1$ denotes hydrogen, alkyl, aralkyl or aryl, $V_2$ denotes hydrogen, alkyl or aralkyl, $R_{14}$ denotes hydrogen, alkyl, aralkyl or aryl, $R_{15}$ denotes hydrogen, alkyl or aralkyl and $R_{16}$ denotes hydrogen, alkyl, alkoxy, aryloxy or aralkoxy and in which the proviso that B=—CO— or —$SO_2$— when $R_{13}=NV_1V_2$ is to apply, can be prepared particularly preferentially by the new process.

In this case also, the abovementioned alkyl and alkoxy radicals are understood as those radicals which contain 1-4 C atoms and are preferably monosubstituted by OH, CN, halogen, $C_1$-$C_4$-alkoxy or $C_2$-$C_5$-alkylcarbonyloxy, whilst the aryl or aryloxy radicals are understood as, preferably, phenyl or phenoxy radicals which are optionally monosubstituted by Cl, Br, $NO_2$, CN, ($C_1$-$C_4$)-alkoxy or ($C_1$-$C_4$)-alkyl.

The cyano-substitution reaction proceeds readily at temperatures of 50° to 100° C. The ready reactivity here is due to the high capacity of the complexes of the formula I for transferring cyanide, either as such or in the form of cyanide complexes, such as, for example, IV, between the different phases: that is to say water and undissolved dyestuff or dyestuff dissolved in an organic (water-immiscible) solvent.

Suitable water-immiscible solvents are the chlorinated hydrocarbons, such as, for example, chloroform, carbon tetrachloride, dichloroethylene, dichloroethylidene and perchloroethylene, and also aromatic solvents, such as benzene, toluene, xylene, mesitylene, chlorobenzene, dichlorobenzene, nitrobenzene and diphenyl.

The new process represents a decisive improvement since it makes it possible to prepare o-cyano-azo dyestuffs in cheap solvents: that is to say water or in a water/organic solvent two-phase system.

Moreover, the organic solvent used, which contains the dyestuff in solution, can be recovered easily by steam distillation, the dyestuff precipitating out in a solid form which can be filtered.

Compared with the aqueous process for the preparation of o-cyano-azo dyestuffs which is known from DOS (German Published Specification) No. 2,134,896, the new process has the advantage of simpler, cheaper handling since, as a result of the low reaction temperature ($\leq 100°$ C.), the use of expensive autoclaves is superfluous. An even greater advantage is to be seen in the fact that a virtually complete conversion is now also achieved in an aqueous system for the first time, whilst the reaction product obtained by the process previously known still contains large amounts of the o-halogeno-azo dyestuff, especially in the case of the preparation of the dicyano dyestuffs.

Compared with the aqueous process for the preparation of o-cyano-azo dyestuffs which is known from DOS (German Published Specification) No. 2,310,745, the new process has the advantage that the catalysts employed are ammonium and phosphonium salts, which are readily accessible industrially, in contrast to N-heterocyclic compounds. A further advantage is to be seen from the fact that water-immiscible solvents are added which permit easy recovery, so that a load on the effluent is avoided.

EXAMPLE 1

206.2 g of a moist 16.8% strength press cake of 3-acetamino-4-(2'-bromo-4',6'-dinitrophenylazo)-N,N-diethylaniline in 250 ml of water are stirred overnight. After adding a solution or suspension of 5.36 g of triphenyl-ethylphosphonium bromide and 7.15 g of copper-I cyanide in 250 ml of water, the mixture is warmed to 100° C. for three hours, whilst stirring. The dyestuff is filtered off and suspended in 500 ml of 5% strength hydrochloric acid, 14 g of anhydrous iron-III chloride are added and the mixture is stirred overnight. After filtering off, washing and drying, 26.5 g of the blue cyano-azo dyestuff, which contains only about 1-2% of the starting dyestuff, are obtained.

If the same experiment is carried out without triphenyl-ethyl-phosphonium bromide, a conversion of at most 3% is obtained.

EXAMPLE 2

103.1 g of a moist 16.8% strength press cake of 3-acetamino-4-(2'-bromo-4'-6'-dinitrophenylazo)-N,N-diethylaniline are suspended in a solution of 2.68 g of triphenyl-ethyl-phosphonium bromide in 200 ml of water. After adding 75 ml of ethylene chloride, the mixture is heated to the boil, whilst stirring. A solution of 2.86 g of copper bromide and 1.96 g of sodium cyanide in 50 ml of water is allowed to run in dropwise in the course of one hour.

The solvent is separated off by steam distillation. 10 ml of concentrated hydrochloric acid and 5 g of iron-III chloride are added and the mixture is stirred overnight at room temperature.

After filtering off, washing and drying, 14.2 g of the cyano-azo dyestuff, which contains only about 1% of the starting dyestuff, are obtained.

If the same experiment is carried out without triphenyl-ethyl-phosphonium bromide, a conversion of at most 3% is obtained.

The experiment which follows shows that a new active copper cyanide complex $$[(C_6H_5)_3C_2H_5P]^{\oplus}Cu(CN)_2^{\ominus}$$

is formed under the above conditions.

A suspension of 1.43 g of copper-I bromide in 100 ml of water is shaken, in a separating funnel, with a solution of 0.98 g of sodium cyanide in 20 ml of water until dissolution is virtually complete.

A solution of 3.71 g of triphenyl-ethyl-phosphonium chloride in 70 ml of water is added slowly to the filtered solution, whilst stirring, and a colourless precipitate separates out immediately. This is filtered off, washed and dried.

Yield: 3.3 g.
Melting point: 150° C.

|  | $C_{22}H_{20}CuN_2P$ (406.9) | | | |
| --- | --- | --- | --- | --- |
|  | C | H | N | P |
| Calculated: | 64.77 | 4.96 | 6.88 | 7.61 |
| Found: | 64.85 | 5.15 | 6.25 | 7.50 |

EXAMPLE 3

103.1 g of a moist 16.8% strength press cake of 3-acetamino-4-(2'-bromo-4',6'-dinitrophenylazo)-N,N-diethylaniline are suspended in 200 ml of water. After adding 5 ml of a 50% strength aqueous solution of benzyl-dodecyl-dimethylammonium chloride ("Zephirol") and 75 ml of ethylene chloride, the mixture is heated to the boil, whilst stirring. A solution of 2.86 g of copper bromide and 1.95 g of sodium cyanide in 50 ml of water is allowed to run in dropwise in the course of one hour. The solvent is separated off by steam distillation, 10 ml of concentrated hydrochloric acid and 5 g of iron-III chloride are added to the residue and the mixture is stirred overnight at room temperature. After filtering off, washing and drying, 14 g of the cyano-azo dyestuff, which still contains about 1% of the starting dyestuff, are obtained.

In this case also a new active copper complex is formed, as is shown by the following experiment. 7.18 g of powdered copper bromide are shaken with a solution of 4.9 g of sodium cyanide in 150 ml of water until virtually all of the copper bromide has gone into solution. 34 g of a 50% strength aqueous solution of benzyl-dodecyl-dimethyl-ammonium chloride ("Zephirol") are added dropwise to the clarified solution and a colourless, semi-crystalline mass precipitates out. The water is decanted off and replaced by 300 ml of distilled water. After stirring for two hours at room temperature, the crystalline product is filtered off, washed and dried in vacuo. Yield: 14.2 g. Melting point: 138°–140° C.

|  | $C_{23}H_{38}CuN_3$ (420.1) | | |
| --- | --- | --- | --- |
|  | C | H | N |
| Calculated: | 65.75 | 9.12 | 10.0 |
| Found: | 66.32 | 9.52 | 9.15 |

EXAMPLE 4

17.33 g of 3-acetamino-4-(2'-bromo-4',6'-dinitrophenylazo)-N,N-diethylaniline are suspended or dissolved in 200 ml of water and 75 ml of ethylene chloride. After adding 6 g of tetraethyl-ammonium chloride, the mixture is warmed to the boil, whilst stirring, and a solution of 2.0 g of sodium cyanide and 2.9 g of copper bromide in 100 ml of water is added dropwise in the course of one hour. The mixture is warmed to the boil under a reflux condenser for a further 7 hours, the ethylene chloride is then separated off by steam distillation and the product is filtered off and washed with 500 ml of 5% hydrochloric acid and water. Yield: 14.6 g.

In a thin layer chromatogram, about 5% of the starting dyestuff are still found in addition to the cyano-azo dyestuff.

EXAMPLE 5

19.6 g of 3-acetamino-4-(2',6'-dibromo-4'-nitrophenylazo)-N,N-dipropylaniline, which is in the form of a moist press cake, are suspended in a solution of 5.36 g of triphenyl-ethyl-phosphonium bromide in 200 ml of water. After adding 100 ml of ethylene chloride, the mixture is heated to the boil, whilst stirring. A solution of 5.72 g of copper bromide and 3.9 g of sodium cyanide in 100 ml of water is allowed to run in dropwise in the course of one hour. The course of the reaction is followed by means of thin layer chromatography. The solvent is separated off by steam distillation. 20 ml of concentrated hydrochloric acid and 20 g of iron-III chloride are added and the mixture is stirred overnight at room temperature. After filtering off, washing and drying, 14.4 g of the dicyano-azo dyestuff, which contains only about 1% of the starting dyestuff and about 2% of the monocyano-azo dyestuff, are obtained.

EXAMPLE 6

13.46 g of 2-methoxy-4-(2',6'-diiodo-4'-nitrophenylazo)-5-methanesulphonamido-N,N-diethylaniline are suspended in 50 ml of water. After adding 1.5 g of triphenyl-ethylphosphonium bromide and 20 ml of ethylene chloride, the mixture is warmed to the boil and a solution of 0.98 g of sodium cyanide and 1.17 g of zinc cyanide in 25 ml of water is added dropwise in the course of one hour. The mixture is warmed to the boil for a further 1.5 hours and, after steam distillation, filtering off and washing, 9.5 g of the dicyano dyestuff, which still contains about 10% of the monoiodomonocyano dyestuff are obtained.

The dyestuffs listed in the table which follows can be prepared in good yields by an analogous or similar procedure.

| Serial No. | Starting material | Cyanide | Phase transfer catalyst | Temp. | Solvent | Reaction product |
|---|---|---|---|---|---|---|
| 7 | 2,6-dibromo-4-nitroaniline → 3-acetaminodiethylaniline | CuCN | $(C_6H_5)_3PC_2H_5Br$ | 100° C. | Water | Azo dye: 2,6-dicyano-4-nitrophenyl–N=N–phenyl with $N(C_2H_5)_2$ and $HNCOCH_3$ substituents |
| 8 | 2-bromo-4,6-dinitroaniline → 3-acetamino-N-ethyl-N-benzylaniline | $NaCu(CN)_2$ | $(C_6H_5)_3PC_4H_9Br$ | 80° C. | Water/ethylene chloride | Azo dye: 2-cyano-4,6-dinitrophenyl–N=N–phenyl with $N(C_2H_5)(CH_2-C_6H_5)$ and $HNCOCH_3$ |
| 9 | 2-bromo-4,6-dinitroaniline → 2-methoxy-5-acetamino-N-cyclohexylaniline | $NaCu(CN)_2$ | $C_6H_5CH_2\overset{\oplus}{-}\underset{(CH_2)_{11}CH_3}{\overset{CH_3}{\underset{|}{\overset{|}{N}}}}-CH_3 \; Cl^\ominus$ | 80° C. | Water/chlorobenzene | Azo dye: 2-cyano-4,6-dinitrophenyl–N=N–phenyl with $OCH_3$, $N(H)(C_6H_{11})$ and $NHCOCH_3$ |
| 10 | 2-bromo-4-nitro-6-methylsulphonylaniline → 3-acetamino-N,N-diethylaniline | $NaCu(CN)_2$ | $(C_6H_5)_3PC_2H_5Cl$ | 80° C. | Water/ethylene chloride | Azo dye: 2-cyano-4-nitro-6-$SO_2CH_3$-phenyl–N=N–phenyl with $N(C_2H_5)_2$ and $HNCOCH_3$ |
| 11 | 2-bromo-4-nitro-6-trifluoromethylaniline → N,N-diethylaniline | $NaCu(CN)_2$ | $(4\text{-}HO{-}C_6H_4)_3SCl$ | 90° C. | Water/tetrachloroethylene | Azo dye: 2-cyano-4-nitro-6-$CF_3$-phenyl–N=N–phenyl with $N(C_2H_5)_2$ |
| 12 | 2-bromo-4-nitro-6-(2′-phenyl-1′,3′,4′-thiadiazolyl-5′)-aniline → 2-methoxy-5-acetamino-N-β-hydroxyethyl-N-β-cyanoethylaniline | $KCu(CN)_2$ | $C_6H_5{-}CH_2\overset{\oplus}{-}\underset{(CH_2)_{11}CH_3}{\overset{C_2H_5}{\underset{|}{\overset{|}{N}}}}{-}C_2H_5$ | 80° C. | Water/ethylene chloride | Azo dye: 2-cyano-4-nitro-6-(2-phenyl-1,3,4-thiadiazol-5-yl)phenyl–N=N–phenyl with $OCH_3$, $N(C_2H_4OH)(C_2H_4CN)$ and $HNCOCH_3$ |

-continued

| Serial No. | Starting material | Cyanide | Phase transfer catalyst | Temp. | Solvent | Reaction product |
|---|---|---|---|---|---|---|
| 13 | 2,6-dibromo-4-nitro-aniline → 3-methane-sulphonamido-N,N-di-ethylaniline | Na$_2$Zn(CN)$_4$ | (C$_6$H$_5$)$_3$PC$_3$H$_7$Cl | 90° C. | Water/tetra-chloro-ethylene | 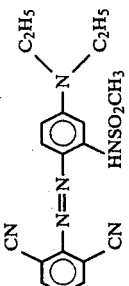 |
| 14 | 2,6-dibromo-4-methyl-sulphonyl-aniline → 3-acetylamino-N,N-dibutylaniline | CuCN | (C$_6$H$_5$)$_3$PC$_4$H$_9$Br | 100° C. | Water | 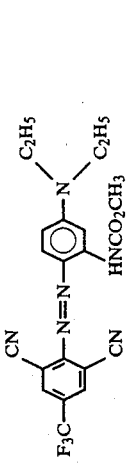 |
| 15 | 2,6-dibromo-4-tri-fluoromethyl-aniline → 3-methoxycarbonyl-amino-N,N-diethyl-aniline | NaCu(CN)$_2$ | (4-HO—C$_6$H$_4$)$_3$SCl | 80° C. | Water/ethylene chloride | 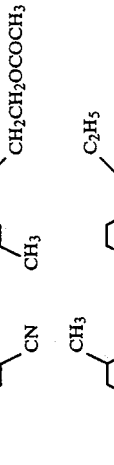 |
| 16 | 2,6-dibromo-4-nitro-aniline → 3-methyl-N-ethyl-N-β-acetoxy-ethyl-aniline | NaCu(CN)$_2$ | CH$_3$(CH$_2$)$_9$⊕—N—CH$_3$ (CH$_3$, Cl⊖, (CH$_2$)$_{11}$CH$_3$) | 80° C. | Water/toluene | 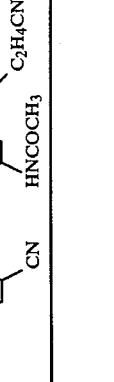 |
| 17 | 2-methyl-4-nitro-6-bromo-aniline → 3-acetamino-N—ethyl-N—β-cyanoethyl-aniline | CuCN | (C$_6$H$_5$)PC$_2$H$_5$Cl | 100° C. | Water |  |

I claim:

1. A process for the preparation of an azo compound which, in the diazo component, contains at least one cyano group in the ortho-position relative to the azo bridge, consisting essentially of reacting the corresponding ortho-halogeno-azo dyestuff with copper-I cyanide or with a metal cyanide of the formula $$Me_pCu(CN)_{p+1} \text{ or } Me_qZn(CN)_{q+2}$$

in which
Me is an alkali metal;
p is 1, 2 or 3; and
q is 1 or 2
in a reaction medium consisting essentially of water or water plus water-immiscible organic solvent and a phase transfer catalyst.

2. Process according to claim 1, characterised in that the phase transfer catalyst employed is of the series of quaternary ammonium and phosphonium salts and also tertiary sulphonium salts.

3. Process according to claim 1, characterised in that the phase transfer catalyst employed is a compound of the formula $$[XR^1R^2R^3(R^4)_n]^{\oplus}A^{\ominus}$$

wherein
X represents nitrogen, phosphorus or sulphur,
$R^1$, $R^2$ and $R^3$ independently of one another represent alkyl, cycloalkyl, aralkyl or aryl,
$R^4$ represents alkyl or aralkyl,
n represents 0 or 1 and
A represents an anion,
with the proviso that n represents 1 when X denotes nitrogen or phosphorus and n represents 0 when X denotes sulphur.

4. Process according to claim 1, characterised in that the phase transfer catalyst employed is a high-molecular anion exchanger with quaternary ammonium or phosphonium radicals.

5. Process according to claim 1, characterised in that the phase transfer catalyst is employed in the amount of 0.1 to 100 mol percent, relative to the halogen to be replaced.

6. Process according to claim 1, characterised in that the phase transfer catalyst is employed in the amount of 1 to 20 mol percent, relative to the halogen to be replaced.

7. Process according to claim 1, characterised in that the reaction of the halogeno-azo dyestuffs with cyano complexes of zinc, of the formula $$Me_qZn(CN)_{q+2}$$

in which
Me denotes an alkali metal and
q denotes the numbers 1 and 2, is carried out in a two phase system.

8. Process according to claim 1, characterised in that the reaction of the halogeno-azo dyestuffs with CuCN is carried out in a purely aqueous medium.

9. Process according to claim 3, characterised in that the reaction is carried out in the presence of a phase transfer catalyst of the formula $$[XR^1R^2R^3(R^4)_n]_pCu(CN)_{p+1}$$

wherein p represents 1, 2 or 3.

10. Process of claim 9, wherein the phase transfer catalyst is employed in the amount of 1 to 20 mol percent, relative to the halogen to be replaced.

11. The process of claim 1, wherein the ortho-halogeno-azo dyestuffs are reacted with the metal cyanides at temperatures of 50° to 100° C.

* * * * *